(12) United States Patent
Itano et al.

(10) Patent No.: US 9,307,174 B2
(45) Date of Patent: Apr. 5, 2016

(54) SOLID-STATE IMAGING APPARATUS USING COUNTER TO COUNT A CLOCK SIGNAL AT START OF CHANGE IN LEVEL OF A REFERENCE SIGNAL

(75) Inventors: Tetsuya Itano, Sagamihara (JP); Hiroki Hiyama, Sagamihara (JP); Kazuhiro Saito, Tokyo (JP); Kohichi Nakamura, Kawasaki (JP); Yu Maehashi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 186 days.

(21) Appl. No.: 13/610,440

(22) Filed: Sep. 11, 2012

(65) Prior Publication Data

US 2013/0087686 A1    Apr. 11, 2013

(30) Foreign Application Priority Data

Oct. 7, 2011   (JP) .................................. 2011-222977

(51) Int. Cl.
*H04N 5/3745* (2011.01)
*H04N 5/378* (2011.01)
*H04N 5/374* (2011.01)

(52) U.S. Cl.
CPC ............. *H04N 5/378* (2013.01); *H04N 5/3742* (2013.01)

(58) Field of Classification Search
CPC ............... G01J 1/44; H04N 3/14; H04N 3/15; H04N 3/1525; H04N 3/155; H04N 5/30; H04N 5/335; H04N 5/3355; H04N 5/341; H04N 5/369; H04N 5/3745; H04N 5/378

USPC .................. 250/214 R, 208.1; 348/294–311; 257/290–292, 440

See application file for complete search history.

(56) References Cited

U.S. PATENT DOCUMENTS

| 7,952,630 | B2 * | 5/2011 | Taura ............................. 348/294 |
| 2010/0253821 | A1 * | 10/2010 | Yamamoto ..................... 348/294 |
| 2012/0242878 | A1 * | 9/2012 | Yoshida ........................ 348/300 |
| 2013/0032695 | A1 * | 2/2013 | Ishibashi .................... 250/208.1 |

FOREIGN PATENT DOCUMENTS

| JP | 2006081203 A | 3/2006 |
| JP | 2009060327 A | 3/2009 |
| JP | 2009296311 A | 12/2009 |
| JP | 2011015365 A | 1/2011 |
| JP | 2011055196 A | 3/2011 |

* cited by examiner

*Primary Examiner* — Que T Le
(74) *Attorney, Agent, or Firm* — Canon USA, Inc. IP Division

(57) ABSTRACT

A solid-state imaging apparatus includes a plurality of pixels arrayed in a matrix, and configured to generate signals by photoelectric conversion; a plurality of read-out circuits disposed on each column of the plurality of pixels arrayed in a matrix pattern, and configured to read out the signals from the plurality of pixels; a plurality of comparison units configured to compare the signals output from the plurality of read-out circuits with a reference signal whose level changes with time; a counter configured to count a clock signal after the level of the reference signal starts a change; a storage unit configured, when a magnitude relationship between the signals output from the plurality of the read-out circuits and the reference signal is reversed; and a reset unit configured to reset the count value stored in the storage unit.

9 Claims, 16 Drawing Sheets

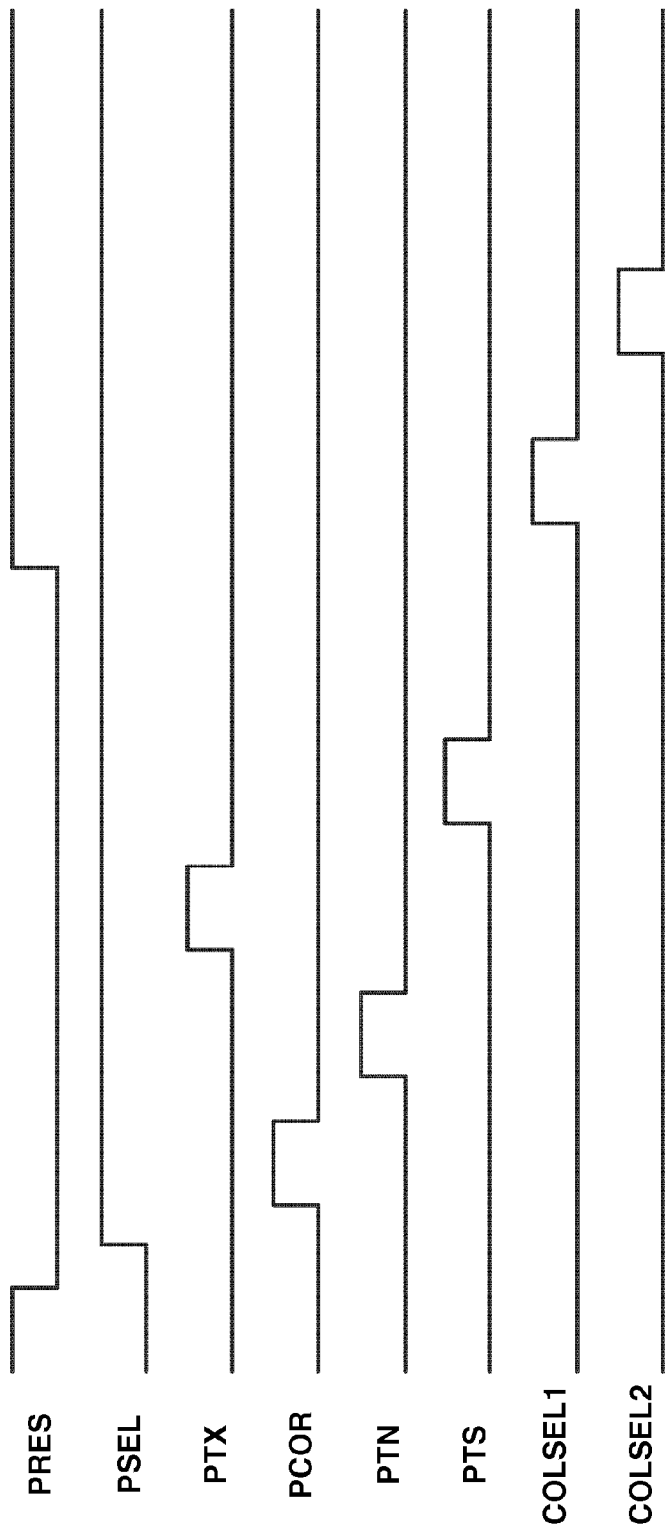

SOLID-STATE IMAGING APPARATUS USING COUNTER TO COUNT A CLOCK SIGNAL AT START OF CHANGE IN LEVEL OF A REFERENCE SIGNAL

BACKGROUND OF THE INVENTION

1. Field of the Invention

One disclosed aspect of the embodiments relates to solid-state imaging apparatuses used for scanners, video cameras, digital still cameras, and so on.

2. Description of the Related Art

In recent years, image sensors having a built-in analog-digital (AD) conversion circuit have been studied. As one configuration of such an image sensor, there is a type called column ADC in which an AD conversion circuit (ADC) is provided for each column of a pixel array. Further, a ramp-type column ADC is well known as one type of AD conversion employed for the column ADC. The ramp-type column ADC system includes a comparison unit provided for each column and a ramp signal source. In general, the comparison unit compares a ramp signal with a pixel signal, while the ramp signal serves as a reference signal. Further, an amount of elapsed time until the relationship between the pixel signal and the ramp signal in terms of the potential has been reversed is measured, and the measured amount of elapsed time is stored as digital data in a column memory that is disposed on each column. For example, Japanese Patent Application Laid-Open No. 2009-60327 discusses a method for using a reference signal (i.e., slope signal) and a counter known as a common counter which counts time that has passed after voltage of the reference signal starts a change from its initial voltage.

In the image sensor including the ramp-type column ADC using the common counter, if there is a large difference in potential between the ramp signal and the pixel signal, comparison processing is not completed within a predetermined AD conversion period, thus data is not written in the storage unit. In such a case, the storage unit stores the data that has been written previously. This may cause abnormal images to be output. Japanese Patent Application Laid-Open No. 2006-81203 discusses a method for suppressing the above problem by adding a level fixing circuit. However, with the method discussed in Japanese Patent Application Laid-Open No. 2006-81203, there is a problem in that a chip area may be increased by adding the level fixing circuit.

SUMMARY OF THE INVENTION

According to an aspect of the embodiments, a solid-state imaging apparatus includes a plurality of pixels arrayed in a matrix, and configured to generate signals by photoelectric conversion, a plurality of read-out circuits disposed on each column of the plurality of pixels arrayed in a matrix pattern, and configured to read out signals from the plurality of pixels, a plurality of comparison units configured to compare the signals output from the plurality of read-out circuits with a reference signal whose level changes with time, a counter configured to count a clock signal after the level of the reference signal starts a change, a storage unit configured to store a count value of the counter for each of the columns when a magnitude relationship between the signals output from the plurality of read-out circuits and the reference signal is reversed, and a reset unit configured to reset the count value stored in the storage unit.

Further features and aspects of the disclosure will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the disclosure and, together with the description, serve to explain the principles of the embodiments.

FIG. 16 is a timing chart illustrating an operation example of the solid-state imaging apparatus in FIG. 14.

DESCRIPTION OF THE EMBODIMENTS

Various exemplary embodiments, features, and aspects of the disclosure will be described in detail below with reference to the drawings. One disclosed feature of the embodiments may be described as a process which is usually depicted as a timing diagram. A timing diagram may illustrate the timing relationships of several entities, such as signals, events, etc. Although a timing diagram may describe the operations as a sequential process, some operations may be performed in parallel or concurrently. In addition, unless specifically stated, the order of the operations or timing instants may be re-arranged. Furthermore, the timing or temporal distances may not be scaled or depict the timing relationships in exact proportions.

Figure 9:
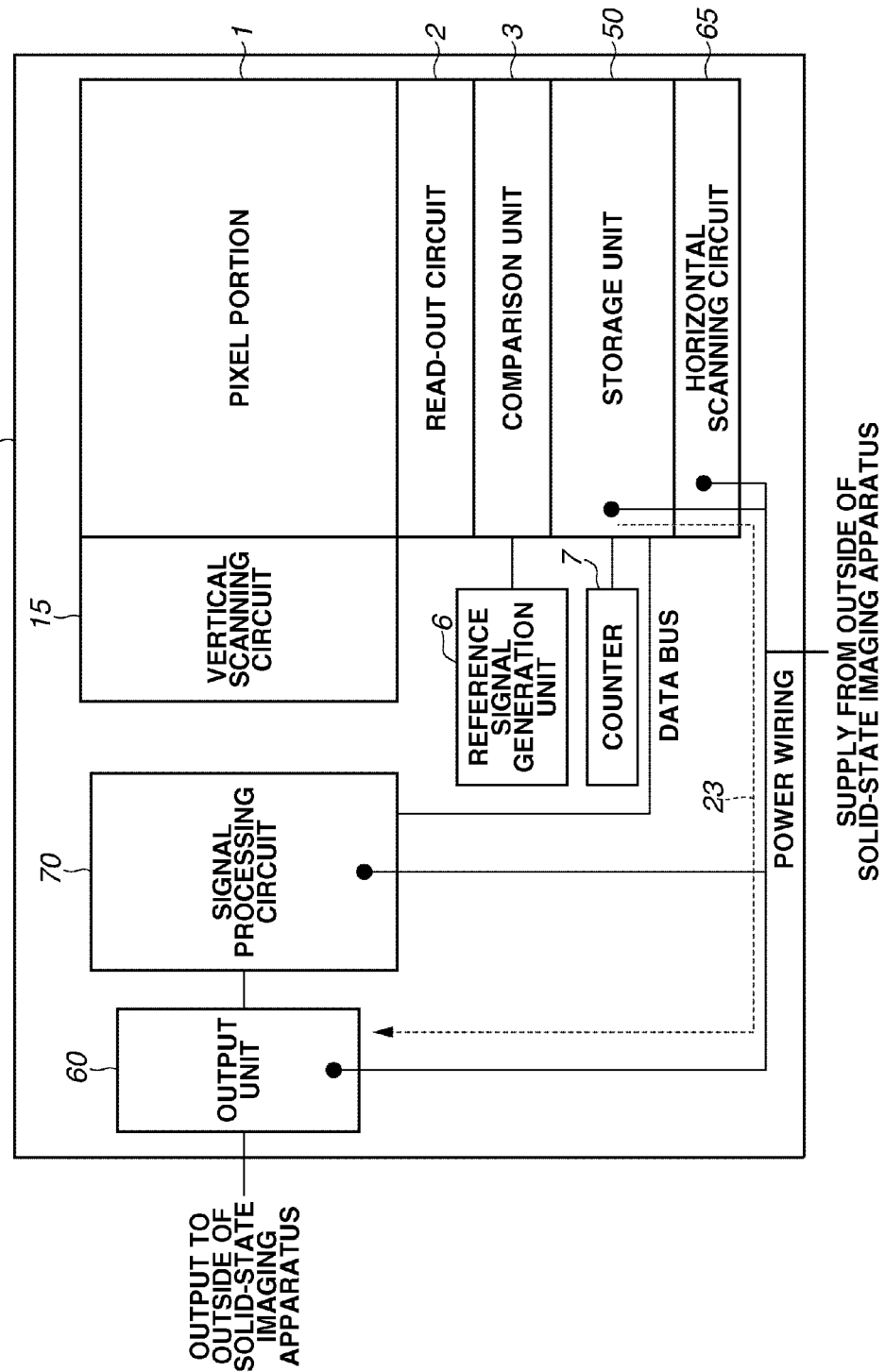
FIG. 9 is a block diagram illustrating a configuration example of the solid-state imaging apparatus according to the first exemplary embodiment.

Hereafter, a first exemplary embodiment will be described. FIG. 9 is a block diagram illustrating a configuration example of a solid-state imaging apparatus according to the present exemplary embodiment. A solid-state imaging apparatus 100 includes a pixel portion 1, a read-out circuit 2, a comparison unit 3; a storage unit 50, a reference signal generation unit 6, a counter 7, a vertical scanning circuit 15, a horizontal scanning circuit 65, a signal processing circuit 70; and an output unit 60. The pixel portion 1 includes a plurality of pixels 210-1 arrayed in a two-dimensional matrix pattern, similarly to a pixel portion 210 illustrated in FIG. 14. The plurality of pixels 210-1 respectively generates signals by photoelectric conversion. The read-out circuit 2 is disposed on each of the columns of the pixels 210-1 arrayed in a matrix pattern, and reads out signals of the plurality of pixels 210-1 column-by-column. The comparison unit 3 is connected to the read-out circuit 2, and compares the signal output from the read-out circuit 2 with a reference signal generated by the reference signal generation unit 6. The level of the reference signal changes with time. The counter 7 counts the time, by counting a clock signal, after the level of the reference signal generated by the reference signal generation unit 6 starts a change. The storage unit 50 is connected to the comparison unit 3, and stores a count value of the counter 7 when the magnitude relationship between the signal output from the read-out circuit 2 and the reference signal generated by the reference signal generation unit 6 is reversed. The vertical scanning circuit 15 controls selection and resetting of the pixels 210-1 in the pixel portion 1 in a row unit. The signal from the horizontal scanning circuit 65 causes each count value stored in the storage unit 50 to be transmitted column-by-column to the signal processing circuit 70 in a sequential manner. The signal processing circuit 70 acquires a difference between the count value of a reset state N-signal of the pixel 210-1 and the count value of a non-reset state S-signal of the pixel 210-1, and extracts a signal component of the pixel 210-1. Further, the signal processing circuit 70 performs other arithmetic processing if needed, and outputs data to the output unit 60.

Figure 14:
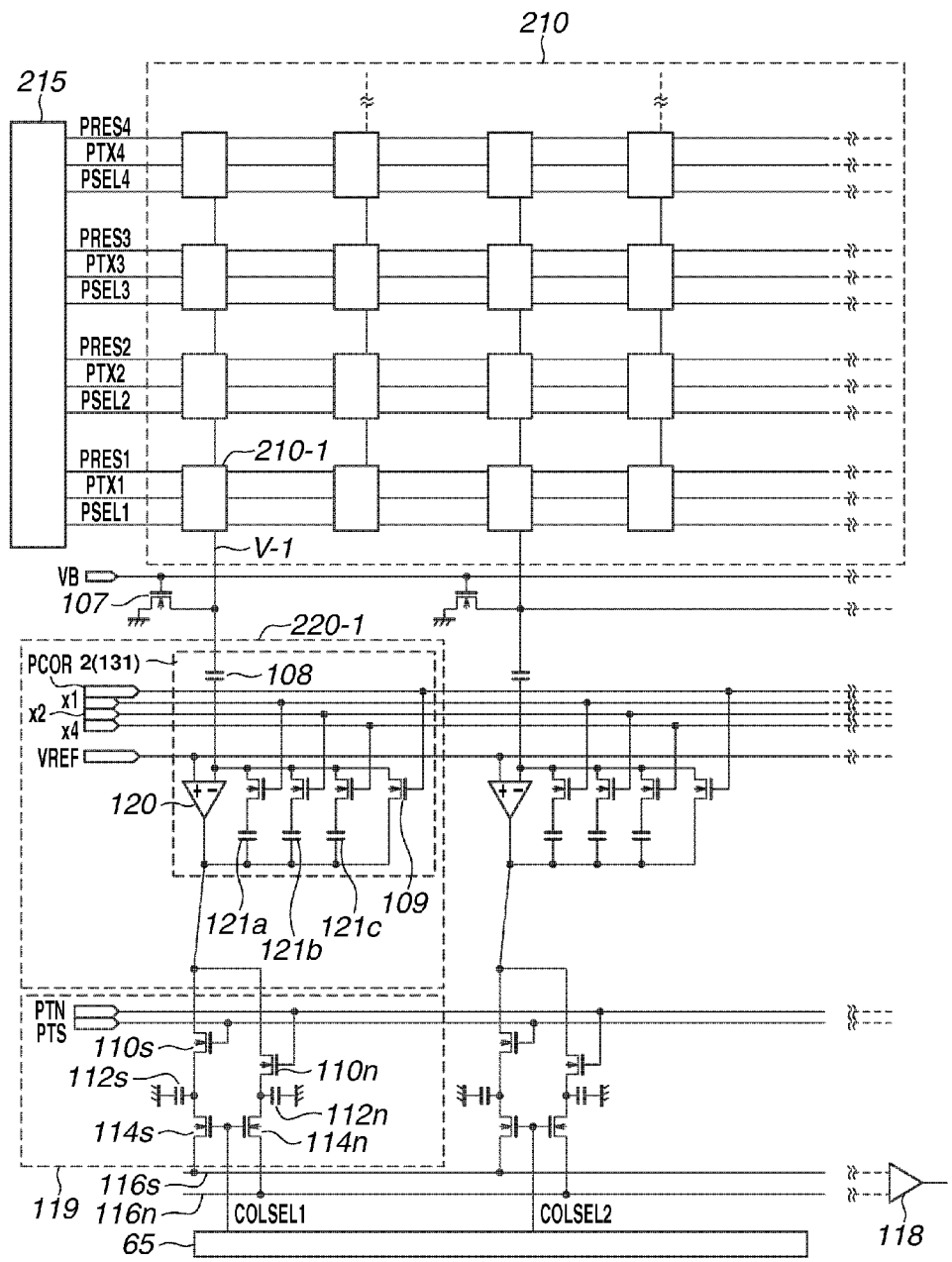
FIG. 14 is a block diagram illustrating a configuration example of the solid-state imaging apparatus.

Subsequently, in order to describe the present exemplary embodiment with ease, descriptions will be given to the configuration and the operation of the solid-state imaging apparatus 100 without having an AD conversion unit. FIG. 14 is a block diagram of the solid-state imaging apparatus 100 illustrating a configuration example of the pixel portion 210 and the read-out circuit 2 disposed on the lower side of the pixel portion 210. Incidentally, in the block diagram of FIG. 14, the comparison unit 3, the reference signal generation unit 6, the counter 7, and the storage unit 50 illustrated in FIG. 9 are omitted. On the other hand, the configuration illustrated in FIG. 1 does not include a correlated double sampling (CDS) circuit 119 and a difference processing unit 118. The CDS circuit 119 is disposed on the latter stage of an amplifier circuit 220-1. The pixel portion 210 is configured of the plurality of pixels 210-1 arrayed in a plurality of columns and a plurality of rows. In FIG. 14, the read-out circuits 2 disposed on the lower side of the pixel portion 210 read out the signals output from the pixels 210 in the odd number columns from the left. On the other hand, the read-out circuits 2 (not shown) disposed on the upper side of the pixel portion 210 read out the signals output from the pixels 210 in the even number columns from the left. In this manner, disposing the read-out circuits 2 in an alternate manner enables each read-out circuit 2 to use an area corresponding to two columns in the pixel portion 210 to be laid out.

Figure 15:
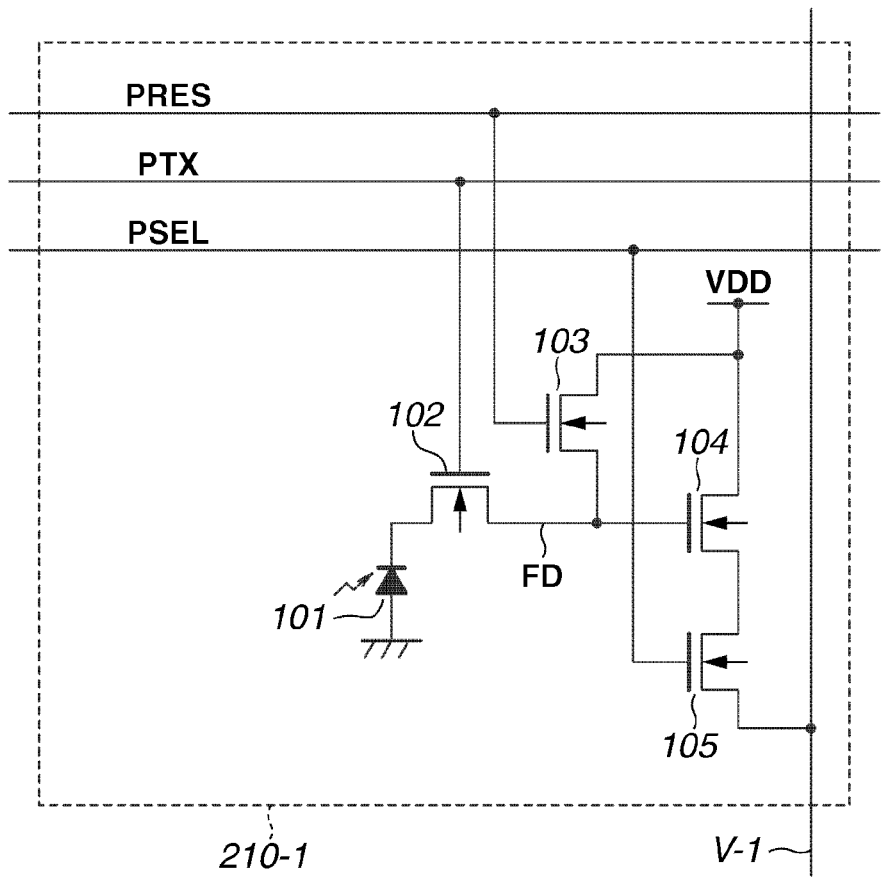
FIG. 15 is an equivalent circuit diagram of a pixel.

FIG. 15 is a circuit diagram of one pixel 210-1. A transfer switch 102 is driven by a transfer pulse PTX. A reset switch 103 is driven by a reset pulse PRES. A row selection switch 105 is driven by a row selection pulse PSEL. Incidentally, "PTX" collectively represents transfer pulses PTX1 through PTXn ("n" is row number). Further, "PRES" collectively represents reset pulses PRES1 through PRESn, and "PSEL" collectively represents row selection pulses PSEL1 through PSELn. Each pixel 210-1 may not necessarily have a row selection switch 105. In this case, selection or non-selection of the pixel 210-1 is executed by causing the reset switch 103 to set the gate potential of an amplifier metal-oxide semiconductor field-effect transistor (MOSFET) 104.

FIG. 16 is a timing chart illustrating an operation example of the solid-state imaging apparatus 100 of FIG. 14. Herein, the operation example of the solid-state imaging apparatus 100 will be described with reference to FIGS. 14 through 16. Prior to the read-out operation, the pixel portion 210 is exposed for a set period of exposure time, so that a photodiode 101 is charged with photoelectric charge. A row that is driven by the respective pulses PRES1, PTX1, and PSEL1, which are output from a vertical scanning circuit 215, is selected in the description below.

First, the pixel reset pulse PRES is shifted from high level to low level, and a reset state of a gate electrode of the amplifier MOSFET 104 is cancelled. At this time, potential corresponding to the cancellation of the reset state is held in a floating diffusion unit FD connected to the gate electrode thereof. Subsequently, when the row selection pulse PSEL becomes high level, an output corresponding to the potential of the floating diffusion unit FD is supplied to a vertical output line V-1 through a source follower circuit including the amplifier MOSFET 104 and a constant current source 107. When a clamp pulse PC0R is activated to high level in the above condition, a clamp switch 109 is turned on, and a variable amplifier unit 131 is in a voltage follower state. As a result, voltage of an electrode of a clamp capacitor 108 on the column amplifier side becomes substantially equal to the voltage VREF. After that, the clamp pulse PC0R is inactivated from high level to low level, and the output on the vertical output line V-1 is clamped.

Next, a storing pulse PTN is activated to high level, so that an off-set signal of the amplifier circuit 220-1 is stored in a holding capacitor 112n via a transfer gate 110n. Thereafter, the transfer pulse PTX is activated to high level, so as to cause the level of the transfer switch 102 to be high for a certain period. Further, the photoelectric charge which is charged in the photodiode 101 is transferred to the gate electrode of the amplifier MOSFET 104. Herein, the electric charge transferred thereto is an electron. When an absolute value for the amount of the transferred electric charge is "Q" and the capacitance of the floating diffusion unit FD is "CFD", the gate potential is reduced by Q/CFD. In response to the above, the potential of the vertical output line V-1 changes. When gain of the source follower is Gsf, a change amount $\Delta Vv1$ of an potential Vv1 on the vertical output line V-1 caused by the electric charge being transferred from the photodiode 101 to the floating diffusion unit FD is expressed by Equation 1.

$$\Delta Vv1 = -Q \cdot Gsf/CFD \quad \text{Equation 1}$$

The variable amplifier unit 131 configured of an operational amplifier 120, the clamp capacitor 108, and feedback capacitors 121a through 121c amplifies voltage of the change amount $\Delta Vv1$. An output Vct of the variable amplifier unit 131 is expressed by Equation 2.

$$Vct = VREF + Q \cdot (Gsf/CFD) \cdot (C0/Cf) \quad \text{Equation 2}$$

Herein, "C0" represents a capacity value of the clamp capacitor 108, whereas "Cf" represents a capacity value of each of the feedback capacitors 121a through 121c which are respectively selected when sensitivity switching pulses x1, x2, and x4 are activated. For example, assuming that C0 is equal to 1 pF (C0=1 pF). With this, Cf is equal to 1 pF (Cf=1 pF) when the feedback capacitor 121a is selected, Cf is equal to 0.5 pF (Cf=0.5 pF) when the feedback capacitor 121b is selected, and Cf is equal to 0.25 pF (Cf=0.25 pF) when the feedback capacitor 121c is selected. In other words, respective voltage amplification ratios expressed by −C0/Cf are set to be minus one-fold, minus two-fold, and minus four-fold. Accordingly, in a system applying negative feedback on the operational amplifier 120, a feedback coefficient determined by a division ratio of Cf and C0 may be changed by switching and selecting a feedback capacitor from among the feedback capacitors 121a through 121c. This enables the voltage amplification ratio to be switched accordingly. Incidentally, the voltage amplification ratio with a minus sign indicates that the circuit is an inverting amplifier circuit. A storing pulse PTS becomes high level after the transfer pulse PTX becomes low level, and the output level from the amplifier circuit 220-1 in this period is stored in a holding capacitor 112s via a transfer gate 110s.

Subsequently, row selection switches 114s and 114n are turned on successively caused by scan pulses COLSEL1, COLSEL2, and so on, which are generated by the horizontal scanning circuit 65. As a result, the signals stored in the holding capacitor 112s are output to a horizontal output line 116s in the order of the columns, and the signals stored in the holding capacitor 112n are output to a horizontal output line 116n in the order of the columns. In other words, signal pairs for the plurality of columns are output to the horizontal output lines 116s and 116n in a sequential manner. The difference processing unit 118 outputs differences between the signal pairs of respective columns output to the horizontal output lines 116s and 116n. This enables noise components included in the signals stored in the holding capacitor 112s to be reduced.

In a case where the CDS circuit is provided on a former part of the comparison unit 3 in FIG. 9, the N signal described below corresponds to a signal sampled by the storing pulse PTN in FIG. 16. On the other hand, in a case where the CDS circuit is not provided thereto, the N signal corresponds to a signal that is output to the vertical output line V-1 by resetting the floating diffusion unit FD. Likewise, in a case where the CDS circuit is provided on a former part of the comparison unit 3, the S signal described below corresponds to a signal sampled by the storing pulse PTS in FIG. 16. On the other hand, in a case where the CDS circuit is not provided thereto, the S signal corresponds to a signal output to the vertical output line V-1 by transferring the electric charge generated by the photodiode 101 to the floating diffusion unit FD.

Figure 1:
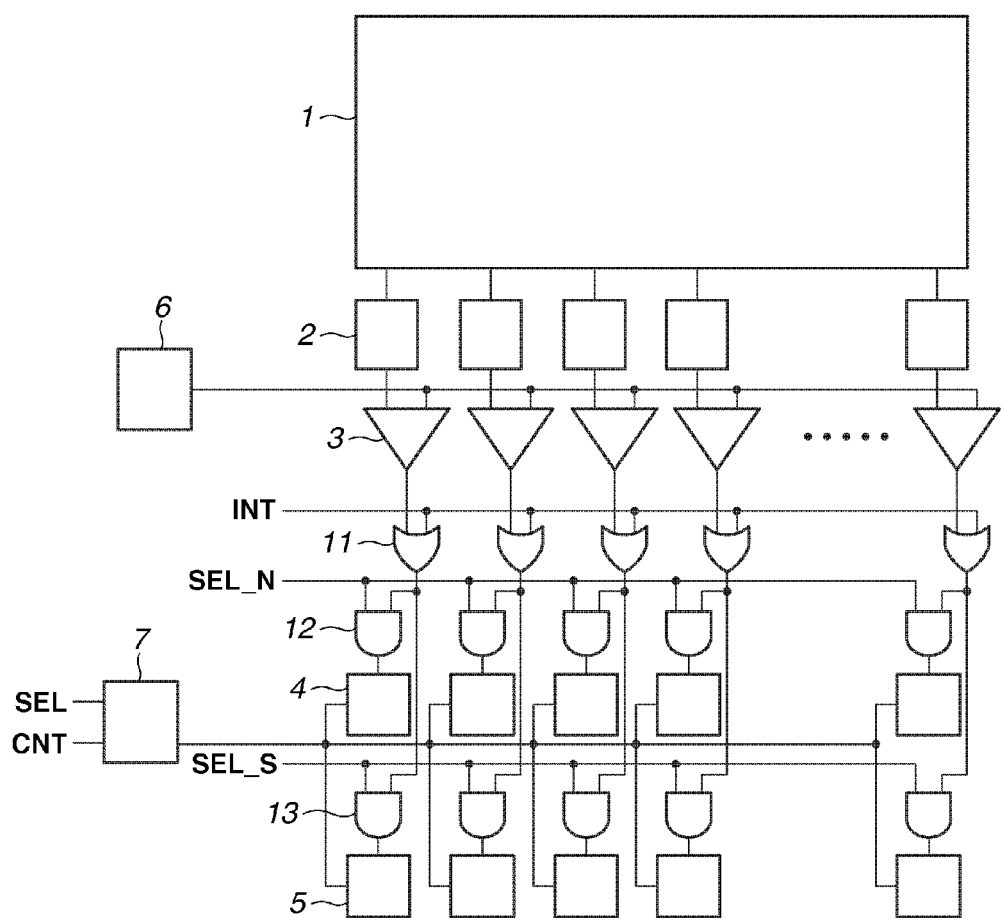
FIG. 1 is a block diagram illustrating a configuration example of a solid-state imaging apparatus according to a first exemplary embodiment.

FIG. 1 is a block diagram illustrating a part of the circuit configuration example of the solid-state imaging apparatus 100 in FIG. 9. The storage unit 50 illustrated in FIG. 9 includes first storage units 4 and second storage units 5. A plurality of the read-out circuits 2 is disposed on a plurality of columns of the pixels 210-1 arrayed in a matrix pattern, and reads out the signals from the pixels 210-1 column-by-column. A plurality of the comparison units 3 is connected to the plurality of read-out circuits 2, and compares the signals output from the plurality of read-out circuits 2 with the reference signal generated by the reference signal generation unit 6. The level of the reference signal changes with time. Respective plurality of logical sum (OR) circuits 11 outputs logical sum signals of the output signals from the comparison units 3 and control signal INT. A plurality of logical product (AND) circuits 12 outputs logical product signals of output signals from the OR circuits 11 and control signal SEL_N. A plurality of AND circuits 13 respectively outputs logical product signals of the output signals from the plurality of OR circuits 11 and control signal SEL_S. The counter 7 receives control signals SEL and CNT, and counts the time passed after the level of the reference signal generated by the reference signal generation unit 6 starts a change.

A plurality of the first storage units 4 receives the output signals of the plurality of AND circuits 12. Each of the first storage units 4 stores a count value for each column counted by the counter 7 when the magnitude relationship between the N signal output from each of the read-out circuits 2 and the reference signal generated by the reference signal generation unit 6 is reversed. A plurality of the second storage units 5 receives the output signals of the plurality of AND circuits 12. Each of the second storage units 5 stores a count value for each column counted by the counter 7 when the magnitude relationship between the S signal output from each of the read-out circuits 2 and the reference signal generated by the reference signal generation unit 6 is reversed. A reset unit includes the OR circuits 11, the AND circuits 12, and the AND circuits 13. The reset unit resets the count values stored in the storage unit 50 including the first storage units 4 and the second storage units 5.

The counter 7 selectively outputs a count value and a reset count value from an internal counter circuit. The count values output from the counter 7 are input to each of the first storage units 4 and the second storage units 5. Each of the first storage units 4 stores the count value for the N signal read out from the pixel 210-1 when the pixel 210-1 is a reset state. Each of the second storage units 5 stores the count value for the S signal read out from the pixel 210-1 when the pixel 210-1 is a non-reset state. The first storage units 4 and the second storage units 5 are selected by the control signals SEL_N and SEL_S, respectively.

The above-selected first storage units 4 or the second storage units 5 store the count values from the counter 7 according to either the output signals from the comparison units 3 or the control signal INT which is common to the plurality of columns. Each of the comparison units 3 compares the potential level of the output signal of the read-out circuit 2 with the potential level of the reference signal, and outputs a high-level signal or a low-level signal according to the comparison result. When the magnitude relationship of the potential level between the output signal from the read-out circuit 2 and the reference signal is reversed, the output potential of the comparison unit 3 shifts either from high level to low level, or from low level to high level. With the timing in which the output potential from each comparison unit 3 is reversed, each of the first storage unit 4 or the second storage unit 5 stores the count value output from the counter 7. According to the signal from the horizontal scanning circuit 65 (see FIG. 9), each of the count values stored in the first storage unit 4 and the second storage unit 5 is transmitted column-by-column to the signal processing circuit 70 in a sequential manner. The signal processing circuit 70 extracts a signal component of each pixel 210-1 by taking a difference between the count value of the first storage unit 4 and the count value of the second storage unit 5. Further, the signal processing circuit 70 performs other arithmetic processing if needed, and outputs data to the output unit 60.

Figure 2:
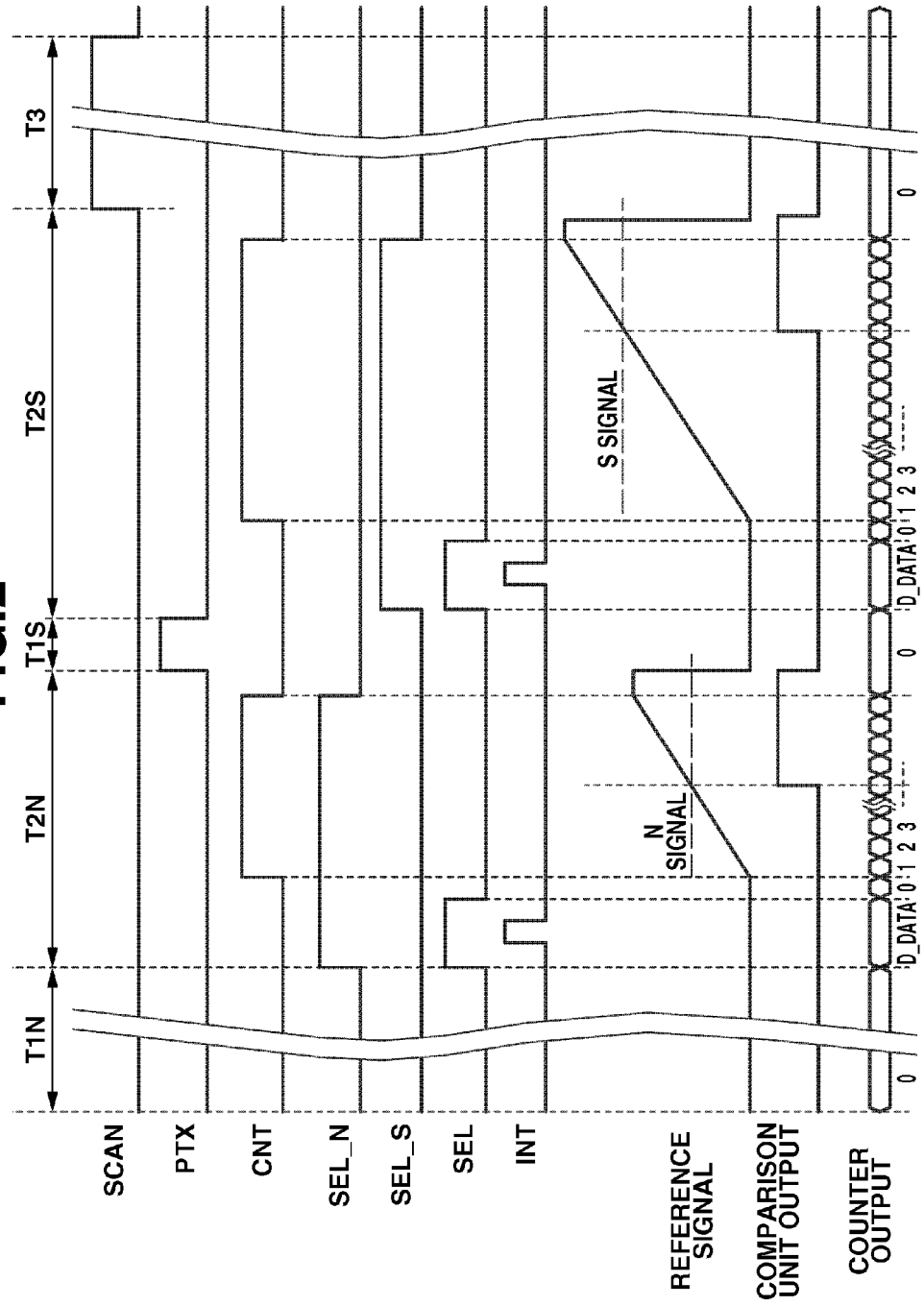
FIG. 2 is a timing chart illustrating an operation example of the solid-state imaging apparatus in FIG. 1.

FIG. 2 is a timing chart illustrating an operation example of the solid-state imaging apparatus 100 in FIG. 1. The timing chart of FIG. 2 illustrates the timing in which the signals from one row of pixels 210-1 selected by the vertical scanning circuit 15 are subjected to AD conversion and are output. The timing chart includes pixel read-out periods T1N, T1S, AD conversion periods T2N, T2S, and a horizontal scanning period T3. In the AD conversion period T2N, the AD conversion is performed on the reset-state N signal of each pixel 210-1. In the AD conversion period T2S, the AD conversion is performed on the non-reset state S signal of each pixel 210-1.

First, in the period T1N, the analog N signal sampled by the storing pulse PTN of FIG. 16 is read out by the read-out circuit 2. Subsequently, in the period T2N, at first, the counter 7 outputs a reset count value D_DATA when the control signal SEL is high level. Then, when the control signal INT is high level while the control signal SEL is high level, the OR circuit 11 outputs a high-level signal. At this time, because the control signal SEL_N is high level, the AND circuit 12 outputs a high-level signal. When the high-level signal is input from the AND circuit 12 to the first storage unit 4, the reset count value D_DATA of the counter 7 is written in the first storage unit 4, which causes the first storage unit 4 to be reset. Thereafter, when the control signal CNT becomes high level, the reference signal generation unit 6 starts generating the reference signal, so that the counter 7 starts a count-up operation.

The counter 7 has an initial value of zero, and counts the time after the reference signal level starts a change. The reference signal is a signal whose level changes with respect to time. Therefore, the reference signal may be a ramp signal whose level linearly changes, or changes in a step-like manner with time. In FIG. 2, a ramp signal is exemplified as the reference signal. When the control signal CTN becomes high level, the reference signal level starts inclining. The comparison unit 3 compares the N signal output from the read-out circuit 2 with the reference signal output from the reference signal generation unit 6. When the potential of the reference signal becomes higher than the potential of the N signal, the comparison unit 3 shifts the output from low level to high level, as illustrated in a comparison unit output in the timing chart of FIG. 2. When the output of the comparison unit 3 becomes high level, the control signal SEL_N becomes high level, so that the AND circuit 12 outputs a high-level signal. When the high-level signal is input from the AND circuit 12 to the first storage unit 4, the count value of the counter 7 is written into the first storage unit 4 as digital data of the AD conversion result of the N signal. After that, when the control signals CNT and SEL_N become low level, change in level of the reference signal is completed, and the value of the counter 7 is reset to zero.

Thereafter, in the period T1S, the transfer pulse PTX (see FIG. 16) becomes high level, and the S signal sampled by the storing pulse PTS in FIG. 16 is read out by the read-out circuit 2. Subsequently, when the control signal SEL is high level in the period T2S, at first, the counter 7 outputs the reset count value D_DATA similarly to the period T2N. Then, when the control signal INT is high level while the control signal SEL is high level, the OR circuit 11 outputs a high-level signal. At this time, because the control signal SEL_S is high level, the AND circuit 13 outputs a high-level signal. When the high-level signal is input from the AND circuit 13 to the second storage unit 5, the reset count value D_DATA of the counter 7 is written into the second storage unit 5, which causes the second storage unit 5 to be reset. Thereafter, when the control signal CNT becomes high level, the reference signal generation unit 6 starts generating the reference signal, so that the counter 7 starts the count-up operation. The counter 7 has an initial value of zero, and counts the time after the reference signal level starts a change. The comparison unit 3 compares the S signal output from the read-out circuit 2 with the reference signal output from the reference signal generation unit 6. When the potential of the reference signal becomes higher than the potential of the S signal, the comparison unit 3 shifts the output from low level to high level, as illustrated in the comparison unit output in the timing chart of FIG. 2. When the output of the comparison unit 3 becomes high level, the control signal SEL_S becomes high level, so that the AND circuit 13 outputs a high-level signal. When the high-level signal is input from the AND circuit 13 to the second storage unit 5, the count value of the counter 7 is written into the second storage unit 5 as digital data of the AD conversion result of the S signal. After that, when the control signals CNT and SEL_S become low level, change in level of the reference signal is completed, and the value of the counter 7 is reset to zero.

Incidentally, different reset count values D_DATA may be written into the first storage unit 4 and the second storage unit 5. Specifically, resetting of the first storage unit 4 may be executed by setting a code of target at the time of dark (reset) or the minimum value that may be taken within a range of normal data. On the other hand, resetting of the second storage unit 5 may be executed by writing the code corresponding to a saturation level. A reset unit includes the OR circuits 11, the AND circuits 12, 13. The reset unit resets the first storage units 4 and the second storage units 5 in different timings.

After the AD conversion period T2S, a scan signal SCAN becomes high level in the horizontal scanning period T3. With this, the signal output from the horizontal scanning circuit 65 (see FIG. 9) causes the count values stored in the first storage units 4 and the second storage units 5 to be transferred column by column to the signal processing circuit 70 sequentially. Changing the row of pixels 210-1 to be read out and repeating the processing illustrated in the timing chart in FIG. 2 enable the signals of the entire or the part of rows of pixels 210-1 to be read out. In the ramp type column ADC using the common counter 7, data is not written into the first storage units 4 and the second storage units 5 when the comparison processing has not been completed in a predetermined AD conversion period T2N and a predetermined AD conversion period T2S. Therefore, as described above, resetting the first storage units 4 and the second storage units 5 to the reset count value D_DATA prior to the start of comparison processing enables abnormal images to be suppressed from being output without adding the level fixing circuit discussed in Japanese Patent Application Laid-Open No. 2006-81203.

Herein, a second exemplary embodiment will be described. In the first exemplary embodiment, either the selected first storage units 4 or the selected second storage units 5 are reset when the control signal INT is high level. Because the entire columns of the first storage units 4 or the second storage units 5 are reset, there may be a risk in that a transient current flowing in the power source and a transient variation on the substrate voltage caused by voltage deflection are increased. Therefore, the present exemplary embodiment provides a method having a beneficial effect with respect to the above phenomena.

Figure 3:
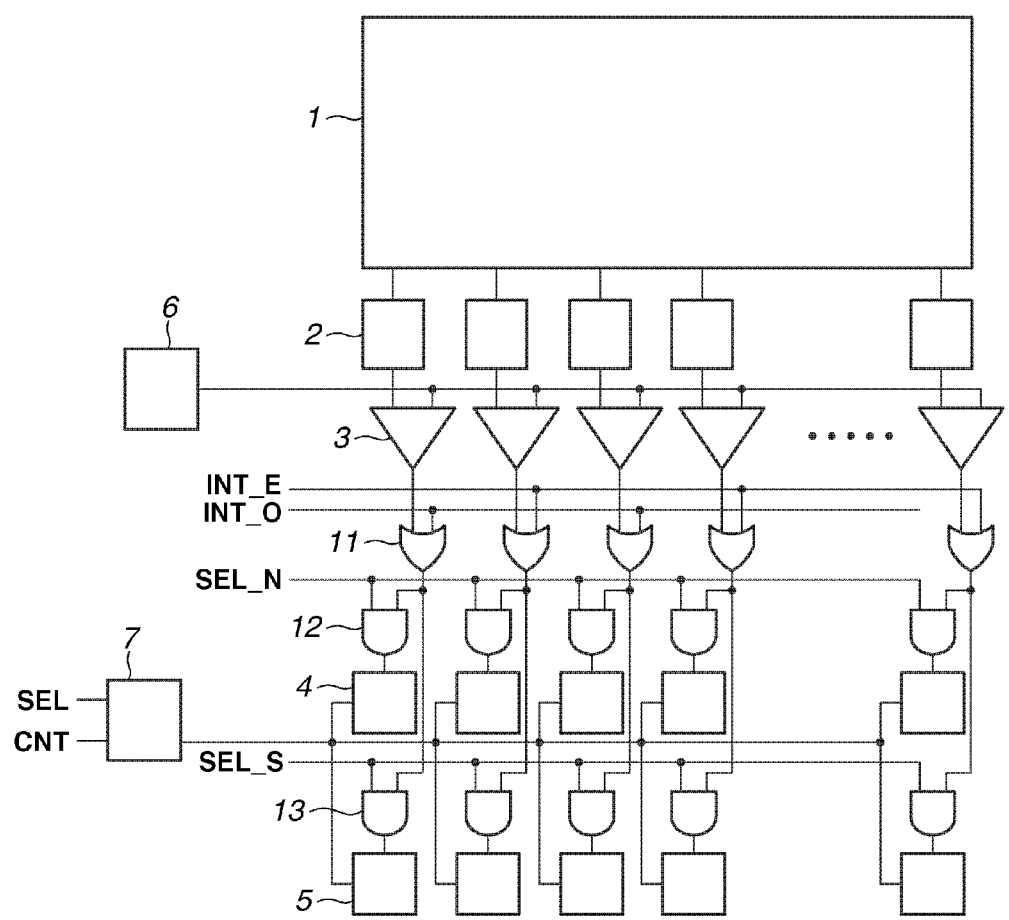
FIG. 3 is a block diagram illustrating a configuration example of a solid-state imaging apparatus according to a second exemplary embodiment.
Figure 4:
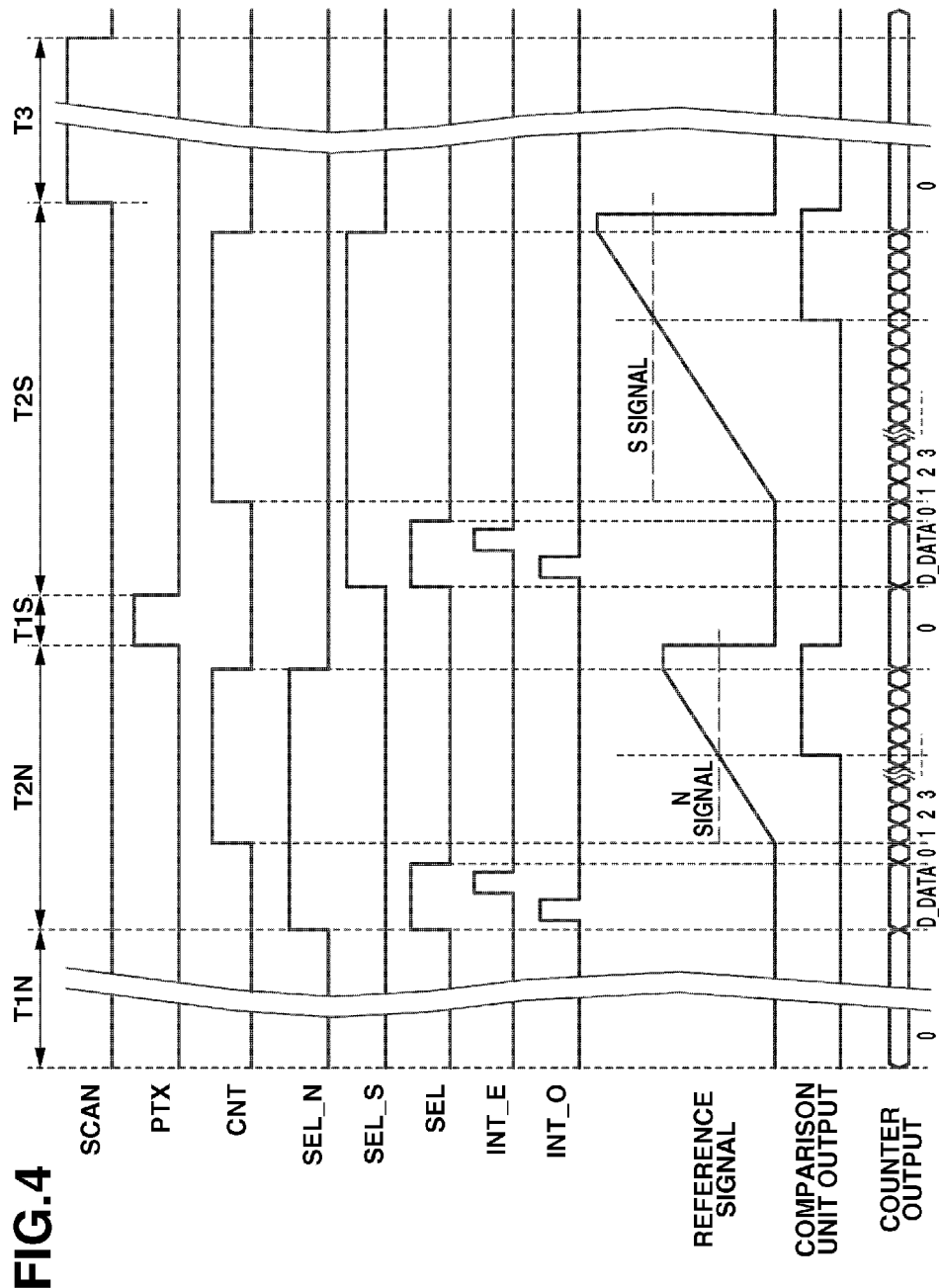
FIG. 4 is a timing chart illustrating an operation example of the solid-state imaging apparatus in FIG. 3.

FIG. 3 is a block diagram illustrating a configuration example of the solid-state imaging apparatus 100 according to the second exemplary embodiment, and FIG. 4 is a timing chart illustrating an operation example of the solid-state imaging apparatus 100 in FIG. 3. Herein, differences between the present exemplary embodiment and the first exemplary embodiment will be described. In FIG. 1, the control signal INT is input to all of the OR circuits 11. On the other hand, in FIG. 3, the OR circuits 11 in the odd number columns output logical sum signals of the output signals from the comparison units 3 and the control signal INT_O, whereas the OR circuits 11 in the even number columns output logical sum signals of the output signals from the comparison units 3 and the control signal INT_E.

As illustrated in the timing chart in FIG. 4, when the control signal SEL is high level, the periods in which the control signals INT_O and INT_E become high level are displaced with each other. With this, the period for resetting the first storage units 4 and the second storage units 5 in the odd number columns and the period for resetting the first storage units 4 and the second storage units 5 in the even number columns may be displaced with each other.

In the period T2N, at first, when t the control signal INT_O becomes high level, the OR circuits 11 in the odd number columns output high-level signals. In addition, because the control signal SEL_N is high level, the AND circuits 12 in the odd number columns output high-level signals. When the AND circuits 12 in the odd number columns input the high-level signals to the first storage units 4 in the odd number columns, the reset count value D_DATA is written into the first storage units 4 in the odd number columns, which causes the first storage units 4 in the odd number columns to be reset. After that, when the control signal INT_E becomes high level, the OR circuits 11 in the even number columns output high-level signals. Then, the AND circuits 12 in the even number columns output high-level signals because the control signal SEL_N is high level. When the AND circuits 12 in the even number columns input the high-level signals to the first storage units 4 in the even number columns, the reset count value D_DATA is written into the first storage units 4 in the even number columns, which causes the first storage units 4 in the even number columns to be reset.

In the period T2S, at first, when the control signal INT_O becomes high level, the OR circuits 11 in the odd number columns output high-level signals. In addition, because the control signal SEL_S is high level, the AND circuits 13 in the odd number columns output high-level signals. When the AND circuits 13 in the odd number columns input the high-level signals to the second storage units 5 in the odd number columns, the reset count value D_DATA is written into the second storage units 5 in the odd number columns, which causes the second storage units 5 in the odd number columns to be reset. After that, when the control signal INT_E becomes high level, the OR circuits 11 in the even number columns output high-level signals. Then, the AND circuits 13 in the even number columns output high-level signals because the control signal SEL_S is high level. When the AND circuits 13 in the even number columns input the high-level signals to the second storage units 5 in the even number columns, the reset count value D_DATA is written into the second storage units 5 in the even number columns, which causes the second storage units 5 in the even number columns to be reset.

In this manner, the first storage units 4 and the second storage units 5 may be divided into a plurality of blocks of the odd number columns and the even number columns. The reset unit includes the OR circuits 11, and the AND circuits 12, 13, and resets a plurality of blocks of the first storage units 4 and the second storage units 5 at timings different from each other. This enables the transient current and the variation in the power source voltage, which are resulted in resetting numbers of the first storage units 4 and the second storage units 5, to be reduced. In the present exemplary embodiment, the first storage units 4 and the second storage units 5 are divided into two blocks including the first storage units 4 and the second storage units 5 in the odd number columns and the first storage units 4 and the second storage units 5 in the even number columns. However, the method of dividing the first storage units 4 and the second storage units 5 into blocks and the number of divided blocks thereof are not limited to the above.

Figure 5:
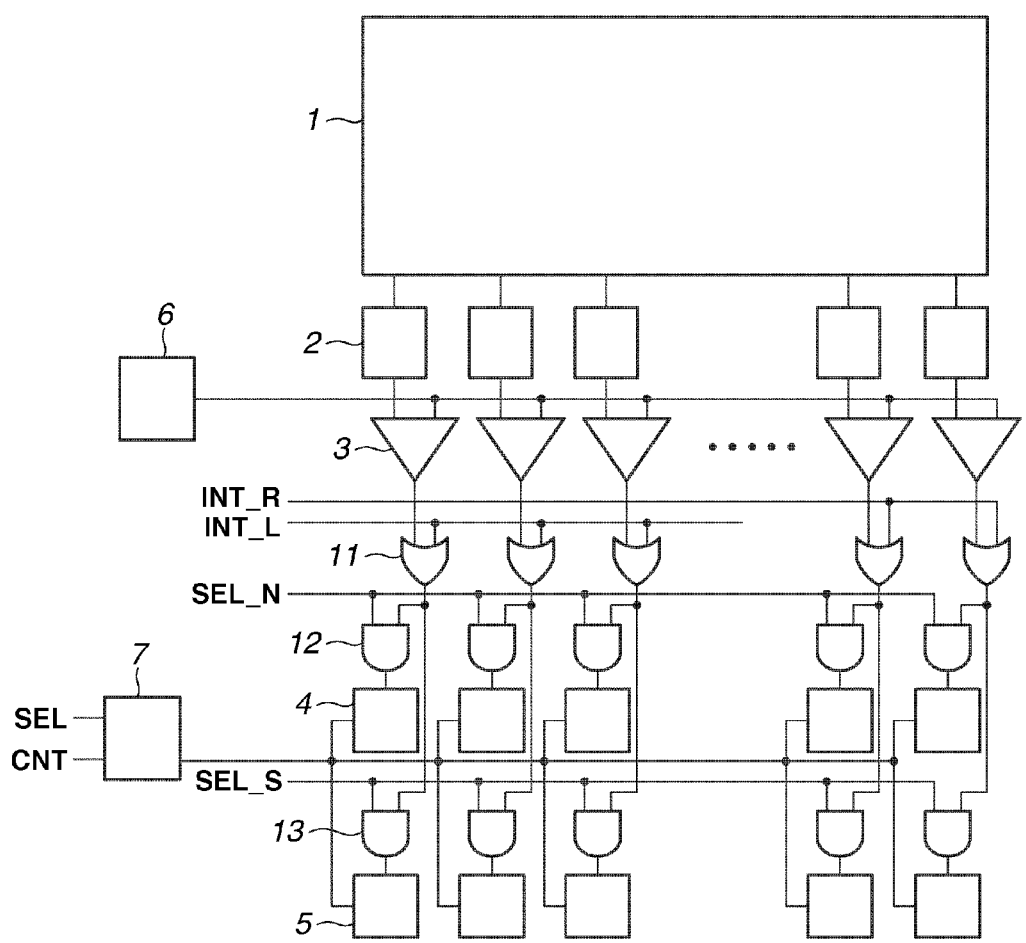
FIG. 5 is a block diagram illustrating another configuration example of the solid-state imaging apparatus according to the second exemplary embodiment.
Figure 6:
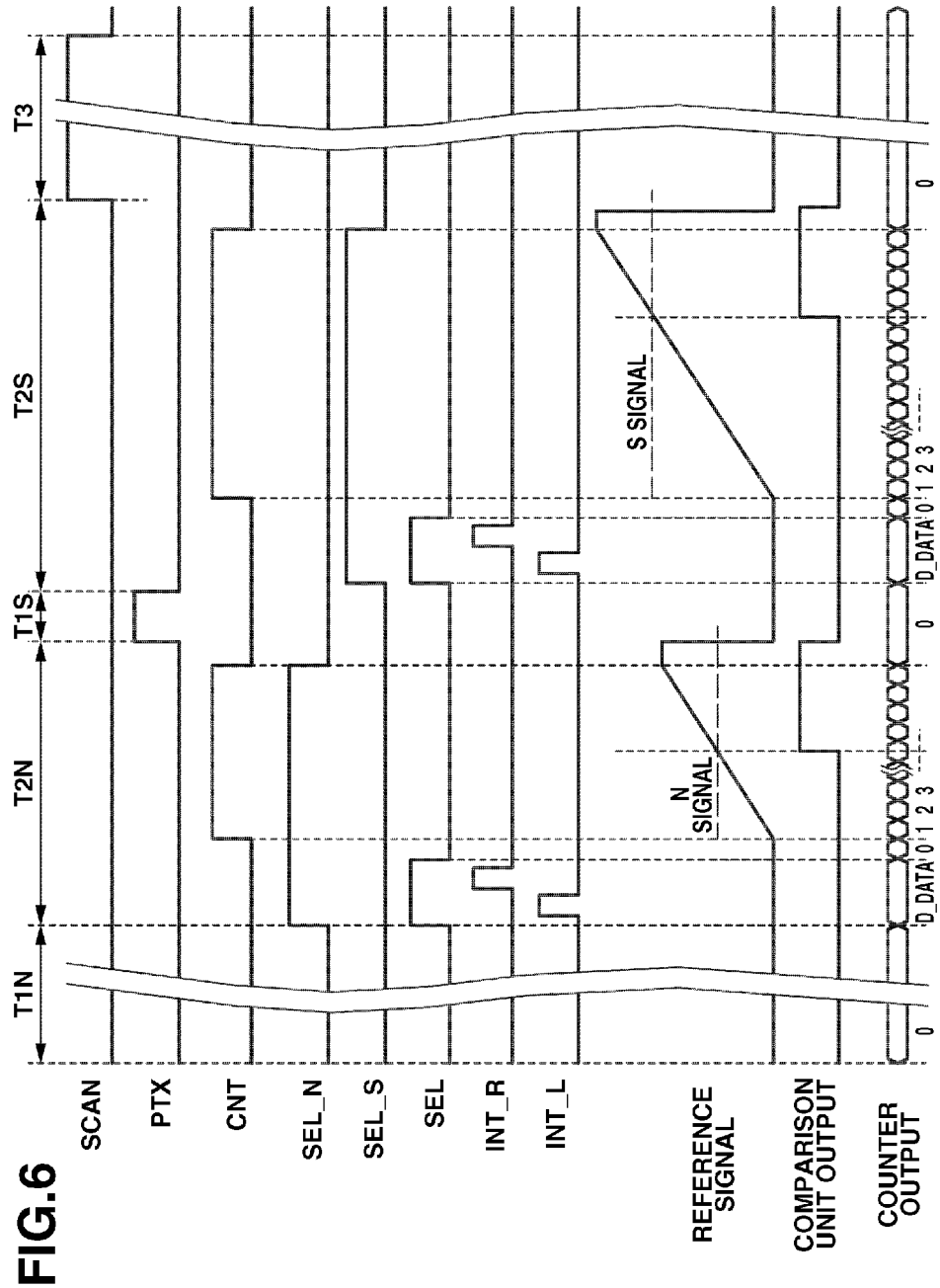
FIG. 6 is a timing chart illustrating an operation example of the solid-state imaging apparatus in FIG. 5.

FIG. 5 is a block diagram illustrating another configuration example of the solid-state imaging apparatus 100 according to the present exemplary embodiment, and FIG. 6 is a timing chart illustrating an operation example of the solid-state imaging apparatus 100 in FIG. 5. The first storage units 4 and the second storage units 5 may be divided into two portions including a right half of the first storage units 4 and the second storage units 5, and a left half of the first storage units 4 and the second storage units 5, for example. With this, the OR circuits 11 in the left half portion output logical sum signals of the output signals from the comparison units 3 and the control signal INT_L, and the OR circuits 11 in the right half portion output logical sum signals of the output signals from the comparison units 3 and the control signal INT_R.

As illustrated in the timing chart of FIG. 6, when the control signal SEL is high level, the periods in which the control signals INT_L and INT_R become high level are displaced with each other. Through this, the period for resetting the first storage units 4 and the second storage units 5 in the left half portion and the period for resetting the first storage units 4 and the second storage units 5 in the right half portion may be displaced with each other.

In the period T2N, at first, when the control signal INT_L becomes high level, the OR circuits 11 in the left half portion output high-level signals. In addition, because the control signal SEL_N is high level, the AND circuits 12 in the left half portion output high-level signals. When the AND circuits 12 in the left half portion input the high-level signals to the first storage units 4 in the left half portion, the reset count value D_DATA is written into the first storage units 4 in the left half portion, which causes the first storage units 4 in the left half portion to be reset. After that, when the control signal INT_R becomes high level, the OR circuits 11 in the right half portion output high-level signals. Then, the AND circuits 12 in the right half portion output high-level signals because the control signal SEL_N is high level. When the AND circuits 12 in the right half portion input the high-level signals to the first storage units 4 in the right half portion, the reset count value D_DATA is written into the first storage units 4 in the right half portion, which causes the first storage units 4 in the right half portion to be reset.

In the period T2S, at first, when the control signal INT_L becomes high level, the OR circuits 11 in the left half portion output high-level signals. In addition, because the control signal SEL_S is high level, the AND circuits 13 in the left half portion output high-level signals. When the AND circuits 13 in the left half portion input the high-level signals to the second storage units 5 in the left half portion, the reset count value D_DATA is written into the second storage units 5 in the left half portion, which causes the second storage units 5 in the left half portion to be reset. After that, when the control signal INT_R becomes high level, the OR circuits 11 in the right half portion output high-level signals. Then, the AND circuits 13 in the right half portion output high-level signals because the control signal SEL_S is high level. When the AND circuits 13 in the right half portion input the high-level signals to the second storage units 5 in the right half portion, the reset count value D_DATA is written into the second storage units 5 in the right half portion, which causes the second storage units 5 in the right half portion to be reset.

As described above, resetting the first storage units 4 and the second storage units 5 by dividing into the right half portion and the left half portion is efficient in that the transient current flowing in the power source may be dispersed.

Figure 7:
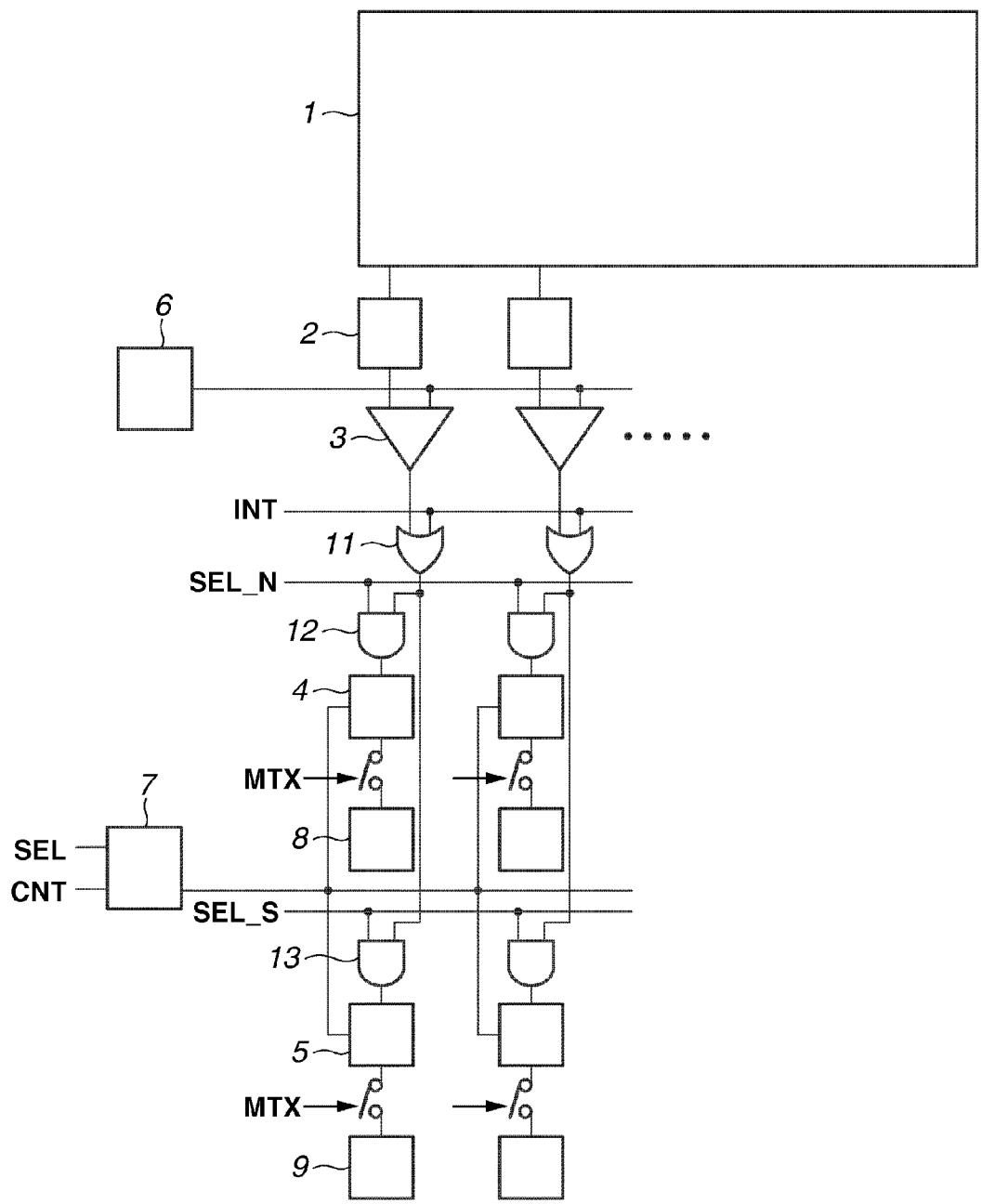
FIG. 7 is a block diagram illustrating a configuration example of a solid-state imaging apparatus according to a third exemplary embodiment.

Herein, a third exemplary embodiment will be described. FIG. 7 is a block diagram illustrating a configuration example of the solid-state imaging apparatus 100 according to the present exemplary embodiment. The block diagram of FIG. 7 includes third storage units 8 and fourth storage units 9 for read-out processing which are added to the block diagram of FIG. 1. When a control signal MTX is high level, the data stored in the first storage units 4 and the second storage units 5 is transferred to the third storage units 8 and the fourth storage units 9, respectively. Herein, differences between the present exemplary embodiment and the first exemplary embodiment will be described.

Figure 8:
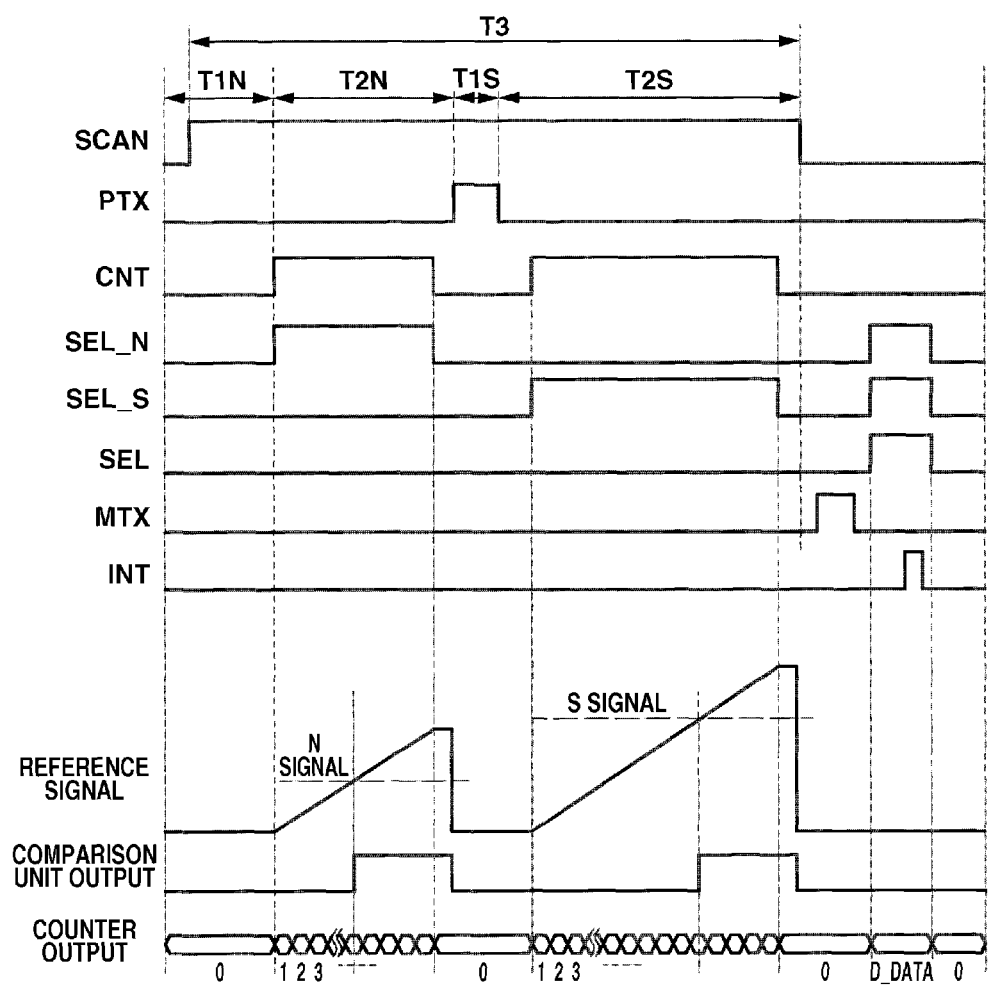
FIG. 8 is a timing chart illustrating an operation example of the solid-state imaging apparatus in FIG. 7.

FIG. 8 is a timing chart illustrating an operation example of the solid-state imaging apparatus 100 in FIG. 7. In the AD conversion periods T2N and T2S, the control signals SEL and INT are kept to be low level, so that the first storage units 4 and the second storage units 5 are not reset by writing the reset count value D_DATA. After the period T2S, the control signal MTX becomes high level, so that the data stored in the first storage units 4 and the second storage units 5 is transferred and stored in the third storage units 8 and the fourth storage units 9, respectively. Subsequently, when the control signal SEL is high level, the counter 7 outputs the reset count value D_DATA. Then, when the control signals SEL_N, SEL_S, and INT become high level, the AND circuits 12 and 13 output the high-level signals. With this, the first storage units 4 and the second storage units 5 are reset by causing the reset count value D_DATA output from the counter 7 to be written in.

In the horizontal scanning period T3, the horizontal scanning circuit 65 sequentially transfers the count values of respective columns stored in the third storage units 8 and the fourth storage units 9 to the signal processing circuit 70. The reset unit includes the OR circuits 11, and the AND circuits 12, 13. The reset unit performs reset processing in a period other than the period T3 when the horizontal scanning circuit 65 performs transfer processing. During the period in which the control signal MTX is high level, the data is transferred to the third storage units 8 and the fourth storage units 9 both of which serve as storage units for read-out processing. This enables the horizontal scanning period T3 to be overlapped with the pixel read-out periods T1N, T1S, and the AD conversion periods T2N, T2S. With this, the frame rate may be improved. When the horizontal scan processing is executed in the pixel read-out periods T1N, T1S, and the AD conversion periods T2N, T2S, as described above, the horizontal scan processing is executed at a faster speed than the pixel read-out periods T1N, T1S, and the AD conversion periods T2N, T2S, in general. For this reason, there is a risk in that the transient current and the variation in the power source voltage, may be generated as a result of resetting the entire columns of the first storage units 4 and the second storage units 5. The above condition will be further described with reference to FIG. 9. As illustrated in FIG. 9, the power is commonly supplied to the storage unit 50, the horizontal scanning circuit 65, the signal processing circuit 70, and the output unit 60 from the outside of the solid-state imaging apparatus 100 via power wirings. The data stored in the storage unit 50 is read out and transferred to the signal processing circuit 70 through a data bus. The signal processing circuit 70 performs arithmetic processing on the data. Thereafter, the data is output from the output unit 60. When the first storage units 4 and the second storage units 5 in the entire columns are reset in the solid-state imaging apparatus 100, for example, variation in the power source due to the transient current flowing in the power source causes crosstalk to occur in the output unit 60 through a dotted-line path 23 in FIG. 9 and the substrate. This variation in the power source causes the abnormal data to be output. In response to such a problem, as illustrated in FIG. 8, the first storage units 4 and the second storage units 5 are reset in a period other than the horizontal scanning period T3. This enables the abnormal data to be suppressed from being output.

Figure 10:
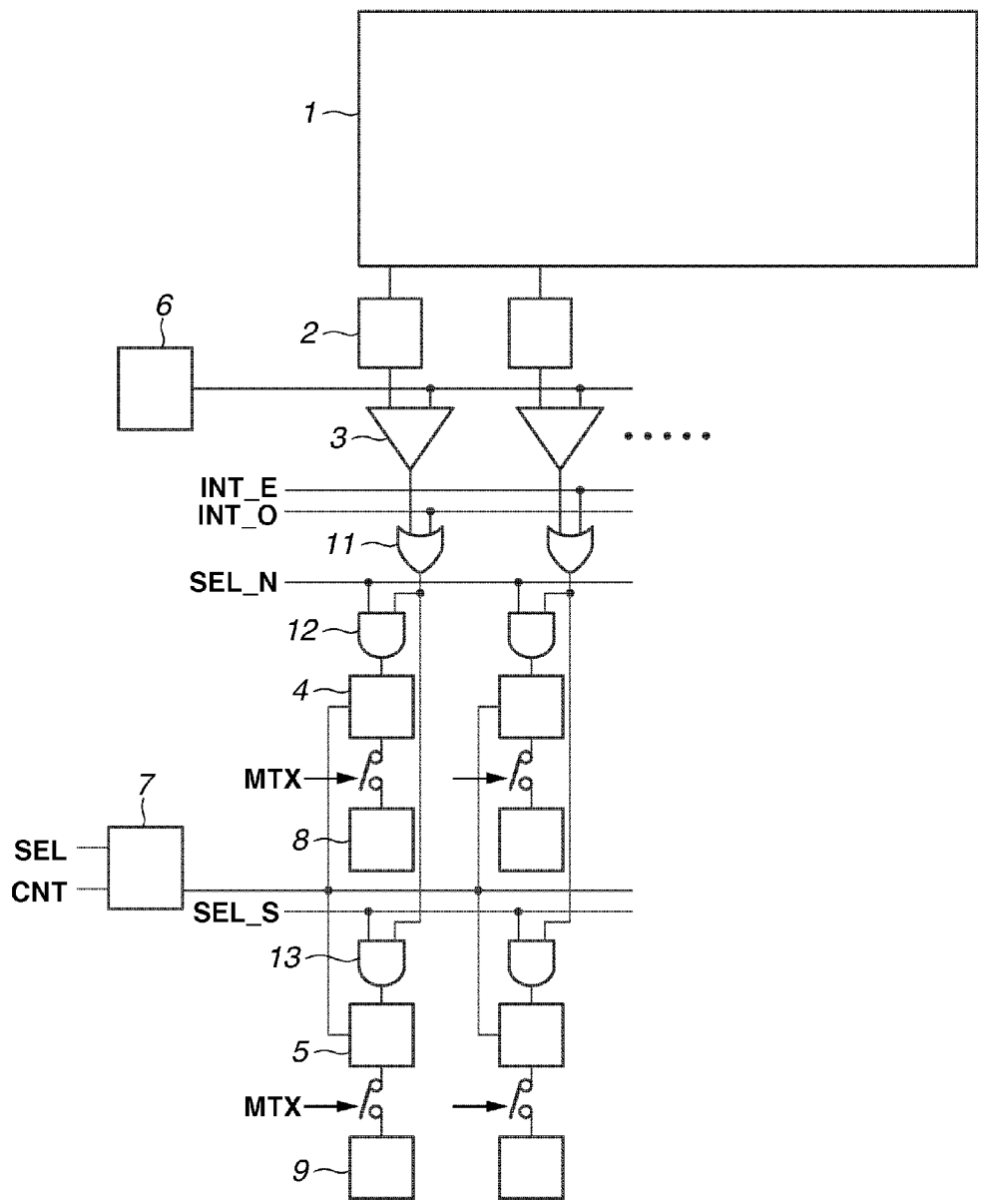
FIG. 10 is a block diagram illustrating a configuration example of the solid-state imaging apparatus according to a fourth exemplary embodiment.

Herein, a fourth exemplary embodiment will be described. FIG. 10 is a block diagram illustrating a configuration example of the solid-state imaging apparatus 100 according to the present exemplary embodiment. The configuration described in the present exemplary embodiment is a combination of the configurations described in the second and the third exemplary embodiments. The OR circuits 11 in the odd number columns output logical sum signals of the output signals from the comparison units 3 and the control signal INT_O. The OR circuits 11 in the even number columns output logical sum signals of the output signals from the comparison units 3 and the control signal INT_E. In the present exemplary embodiment, the first storage units 4 and the second storage units 5 are divided into two blocks including the first storage units 4 and the second storage units 5 in the odd number columns, and a block including the first storage units 4 and the second storage units 5 in the even number columns.

Figure 11:
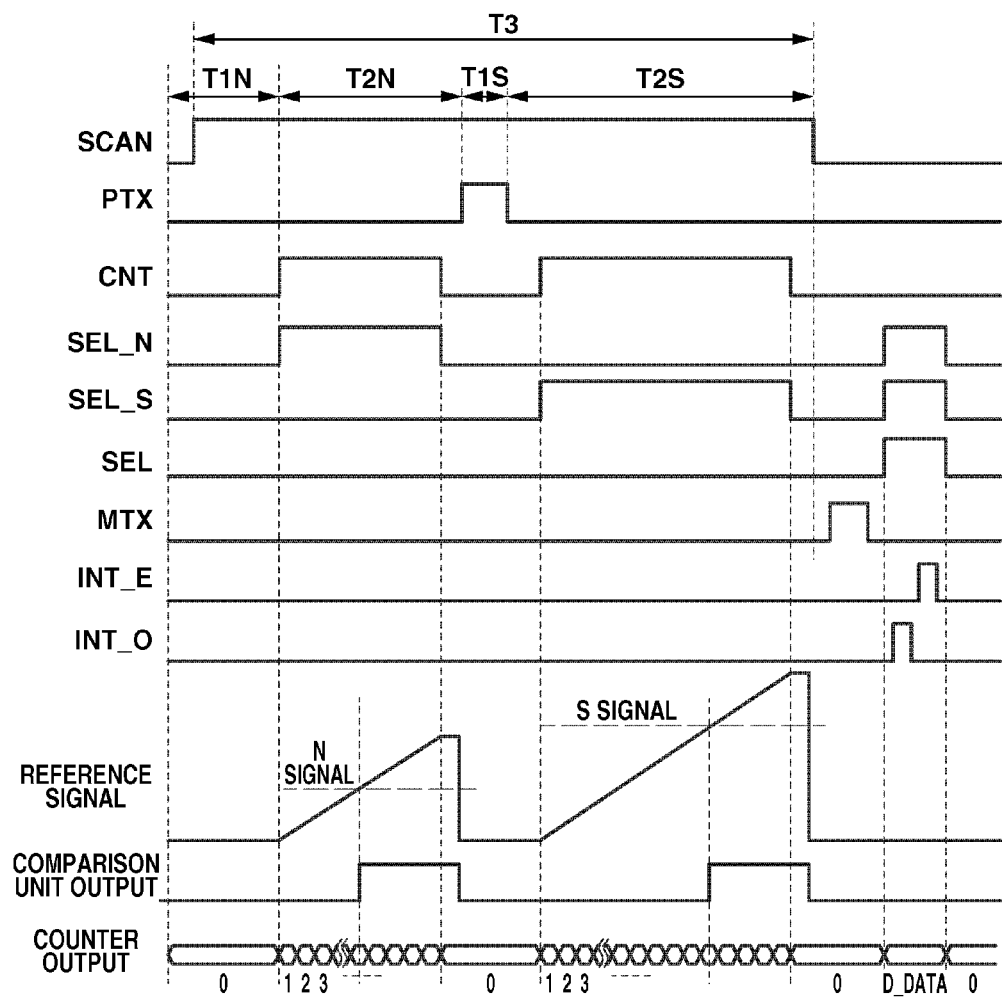
FIG. 11 is a timing chart illustrating an operation example of the solid-state imaging apparatus in FIG. 10.

FIG. 11 is a timing chart illustrating an operation example of the solid-state imaging apparatus 100 in FIG. 10. First, when the control signal INT_O is high level, the first storage units 4 and the second storage units 5 in the odd number columns are reset by causing the reset count value D_DATA to be written in. Then, when the control signal INT_E is high level, the first storage units 4 and the second storage units 5 in the even number columns are reset by causing the reset count value D_DATA to be written in. By displacing the respective periods in which the control signals INT_O and INT_E become high level, the period for resetting the first storage units 4 and the second units 5 in the odd number columns and the period for resetting the first storage units 4 and the second storage units 5 in the even number columns may be displaced with each other. As described above, the first storage units 4 and the second storage units 5 are divided into a plurality of blocks, so that the first storage units 4 and the second storage units 5 are reset at timings different from the blocks. This enables the transient current and the variation in the power source voltage, which are resulted in resetting numbers of the first storage units 4 and the second storage units 5, to be reduced. As with the case of the third exemplary embodiment described above, the transient current and the power voltage variation, which are resulted in resetting the entire columns of the first storage units 4 and the second storage units 5, tend to be high in the present exemplary embodiment. For this reason, the above described method is particularly efficient in the present exemplary embodiment. In addition, in the present exemplary embodiment, the first storage units 4 and the second storage units 5 are divided into two blocks including the first storage units 4 and the second storage units 5 in the odd number columns, and a block including the first storage units 4 and the second storage units 5 in the even number columns. However, as with the case of the second exemplary embodiment, the method of dividing the first storage units 4 and the second storage units 5 into blocks is not limited thereto.

Figure 12:
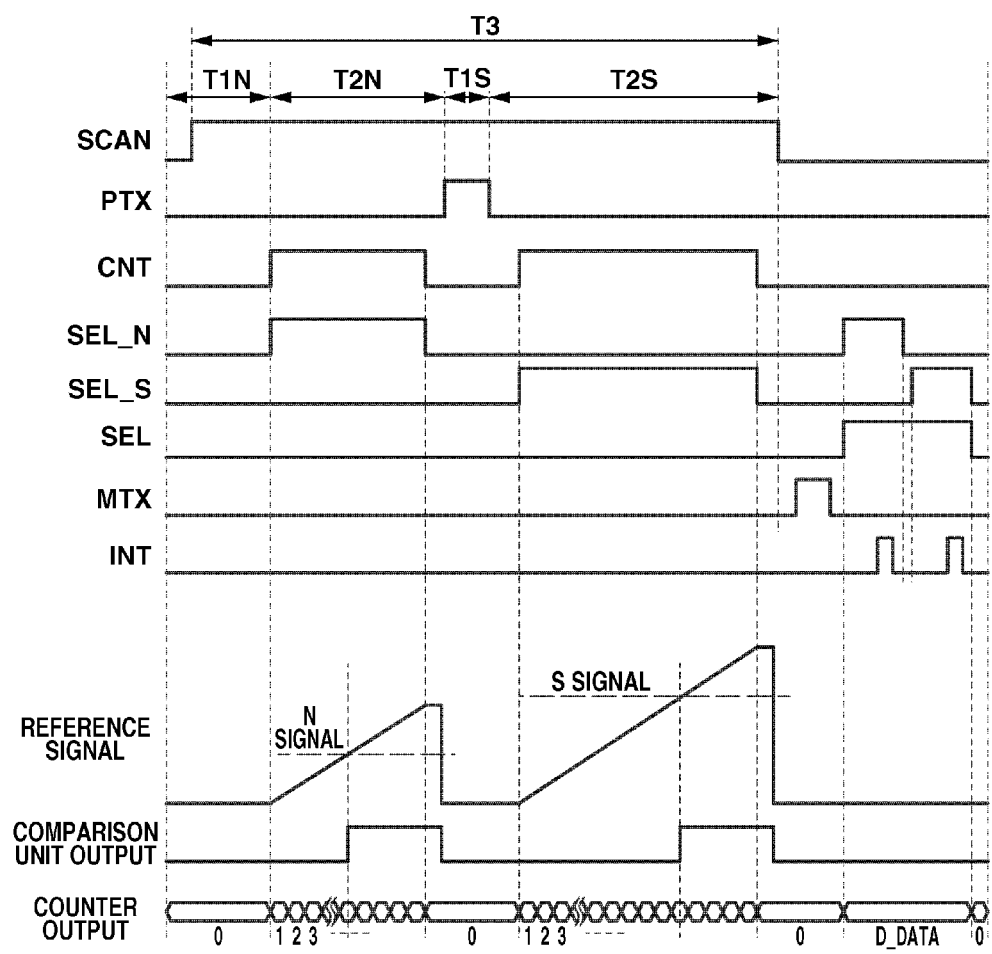
FIG. 12 is a timing chart illustrating an operation example of the solid-state imaging apparatus according to a fifth exemplary embodiment.

Herein, a fifth exemplary embodiment will be described. FIG. 12 is a timing chart illustrating an operation example of the solid-state imaging apparatus 100 according to the present exemplary embodiment. A circuit configuration of the solid-state imaging apparatus 100 according to the present exemplary embodiment is the same as that in FIG. 7. Hereinafter, differences between the third exemplary embodiment and the present exemplary embodiment will be described. After the period T2S, when the control signal MTX becomes high level, the data stored in the first storage units 4 and the second storage units 5 is transferred and stored in the third storage units 8 and the fourth storage units 9 respectively. Next, when the control signal SEL is high level, the counter 7 outputs the reset count value D_DATA. When the control signals SEL_N and INT become high level, the AND circuits 12 output high-level signals, and the first storage units 4 are reset by causing the reset count value D_DATA output from the counter 7 to be written in. When the control signals SEL_S and INT become high level, the AND circuits 13 output high-level signals, and the second storage units 5 are reset by causing the reset count value D_DATA output from the counter 7 to be written in.

By displacing the respective periods in which the control signals SEL_N and SEL_S for resetting the first storage units 4 and the second storage units 5 become high level, the period for resetting the first storage units 4 and the period for resetting the second storage units 5 may be displaced with each other. As described above, the first storage units 4 and the second storage units 5 are reset at timings different from each other. This enables the transient current and the variation in the power source voltage, which are resulted in resetting numbers of the first storage units 4 and the second storage units 5, to be reduced. Incidentally, different reset count values D_DATA may be written in the first storage units 4 and the second storage units 5.

Figure 13:
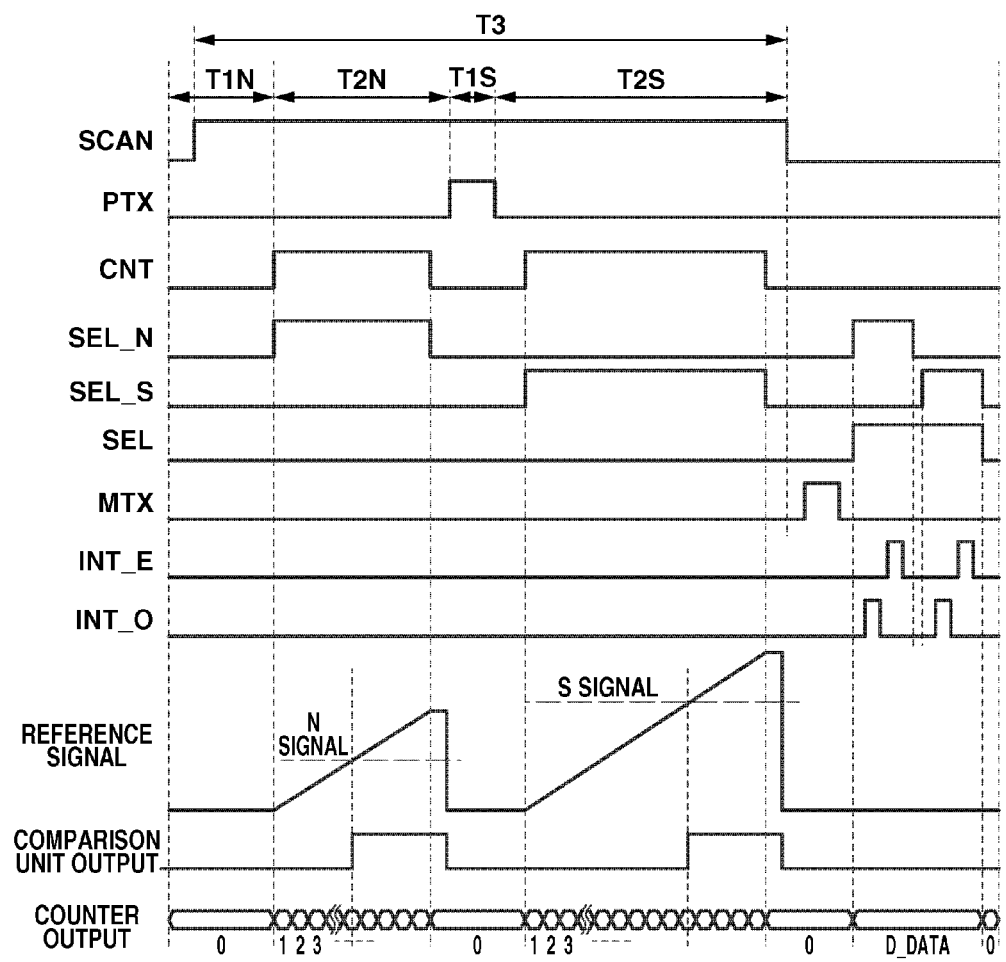
FIG. 13 is a timing chart illustrating an operation example of the solid-state imaging apparatus according to a sixth exemplary embodiment.

Herein, a sixth exemplary embodiment will be described. FIG. 13 is a timing chart illustrating an operation example of the solid-state imaging apparatus 100 according to the present exemplary embodiment. A circuit configuration of the solid-state imaging apparatus 100 according to the present exemplary embodiment is the same as that in FIG. 10. Hereinafter, differences between the fourth exemplary embodiment and the present exemplary embodiment will be described. After the period T2S, when the control signal MTX becomes high level, the data stored in the first storage units 4 and the second storage units 5 is transferred and stored in the third storage units 8 and the fourth storage units 9 respectively. Next, when the control signal SEL is high level, the counter 7 outputs the reset count value D_DATA. When the control signals SEL_N and INT_O become high level, the AND circuits 12 in the odd number columns output high-level signals, and the first storage units 4 in the odd number columns are reset by causing the reset count value D_DATA output from the counter 7. When the control signals SEL_N and INT_E become high level, the AND circuits 12 in the even number columns output high-level signals, and the first storage units 4 in the even number columns are reset by causing the reset count value D_DATA output from the counter 7 to be written in. When the control signals SEL_S and INT_O become high level, the AND circuits 13 in the odd number columns output high-level signals, and the second storage units 5 in the odd number columns are reset by causing the reset count value D_DATA output from the counter 7 to be written in. When the control signals SEL_S and INT_E become high level, the AND circuits 13 in the even number columns output high-level signals, and the second storage units 5 in the even number columns are reset by causing the reset count value D_DATA output from the counter 7 to be written in.

In the present exemplary embodiment, by displacing the periods in which the control signals SEL_N and SEL_S become high level, the period for resetting the first storage units 4 and the period for resetting the second storage units 5 are displaced with each other. In addition, by displacing the respective periods in which the control signals INT_O and INT_E become high level, the period for resetting the first storage units 4 and the second storage units 5 in the odd number columns and the period for resetting the first storage units 4 and the second storage units 5 in the even number columns are displaced with each other. Accordingly, in the present exemplary embodiment, a number of the first storage units 4 and the second storage units 5 which are reset simultaneously is further reduced when compared to the cases described in the second, the fourth, and the fifth exemplary embodiments.

According to the first through the sixth exemplary embodiments, the count values stored in the first storage units 4 and the second storage units 5 are reset. Accordingly, if the magnitude relationship between the output signal from each of the read-out circuits 2 and the reference signal is not reversed while the output signal from each of the comparison units 3 is not inverted, the reset count value is stored in the first storage unit 4 and the second storage unit 5 after completion of the comparison processing. As a result, an abnormal image is suppressed from being output.

Incidentally, the above-described exemplary embodiments are merely examples, and shall not be construed as limiting the technical scope of the embodiments. Accordingly, the embodiments may be realized in diverse ways without departing from the scope of the technical spirit or main features of the disclosure.

While the disclosure has been described with reference to exemplary embodiments, it is to be understood that the disclosure is not limited to the disclosed exemplary embodiments. The scope of the following claims is to be accorded the broadest interpretation so as to encompass all modifications, equivalent structures, and functions.

This application claims priority from Japanese Patent Application No. 2011-222977 filed Oct. 7, 2011, which is hereby incorporated by reference herein in its entirety.

What is claimed is:

1. A solid-state imaging apparatus comprising:
a pixel configured to output a signal generated by photoelectric conversion;
a comparison unit configured to output a comparison signal whose signal level is according to a result of comparing the signal output from the pixel, and a reference signal whose level changes with time;
a storage unit;
a counter configured to generate the count signal by counting a clock signal;
a reset unit configured to output a control signal for resetting the storage unit;
a first path to which the comparison signal is output from the comparison unit;
a second path to which the control signal is output from the reset unit; and
a logic sum circuit including an input part and an output part, wherein the first path and the second path are connected to the input part and the storage unit is connected to the output part.

2. The solid-state imaging apparatus according to claim 1, wherein the storage unit includes:
a first storage unit configured to store the count value based on the signal output from the pixel in a reset state; and
a second storage unit configured to store the count value based on the signal output from the pixel in a non-reset state.

3. The solid-state imaging apparatus according to claim 1, wherein the storage unit is divided into a plurality of blocks; and
wherein the reset unit resets the plurality of blocks of the storage unit at timings different from each other.

4. The solid-state imaging apparatus according to claim 2, wherein the reset unit resets the first storage unit and the second storage unit at timings different from each other.

5. The solid-state imaging apparatus according to claim 1 further comprising:
   a plurality of pixels disposed in a plurality of rows and a plurality of columns;
   a plurality of comparison units, each comparison unit of which is disposed corresponding to one of the columns;
   a plurality of storage units each storage unit of which is disposed corresponding to one of the columns; and
   a scanning circuit configured to sequentially transfer the count value of each column stored in the storage unit,
   wherein the reset unit executes resetting processing in a period other than a period for the scanning circuit to execute transfer processing.

6. The solid-state imaging apparatus according to claim 2,
   wherein the reset unit executes resetting processing by writing a data having a first value to the first storage unit; and
   wherein the reset unit executes resetting processing by writing a data having a second value which is different from the first value, to the second storage unit.

7. A method for driving a solid-state imaging apparatus, the solid-state imaging apparatus comprising:
   a pixel configured to output a signal generated by photoelectric conversion;
   a comparison unit configured to output a comparison signal whose signal level is according to a result of comparing the signal output from the pixel, and a reference signal whose level changes with time; and
   a storage unit;
   the method comprising:
   comparing the signal output from the pixel and a reference signal whose level changes with time;
   outputting a count signal generated by counting a clock signal;
   storing the count value by the of storage unit, when the result of the comparing is changed; and
   resetting the count value stored in the storage unit in a period different from a period in which the comparing is performed.

8. The method according to claim 7,
   the solid-state imaging apparatus further comprising:
   a plurality of pixels disposed in a plurality of rows and a plurality of columns;
   a plurality of read-out circuits, each read-out circuit of which is disposed corresponding to one of the columns; and
   a plurality of storage units, each storage unit of which is disposed corresponding to one of the read-out circuits;
   wherein the outputting includes:
   first outputting the signal by the plurality of pixels included in a first row of the plurality of rows, to the plurality of read-out circuits; and
   second outputting the signal by the plurality of pixels included in a second row of the plurality of rows, to the plurality of read-out circuits;
   wherein the comparing includes a first operation that the signal output to the read-out circuit by the first outputting is compared with the reference signal whose level changes with time,
   wherein the comparing includes a second operation that the signal output to the read-out circuit by the second outputting is compared with the reference signal whose level changes with time, and
   wherein the resetting is performed between end of the first operation and start of the second operation.

9. The solid-state imaging apparatus according to claim 1, wherein
   the counter further outputs a reset signal, and
   when a signal level of the control signal changes, the storage unit is reset by storing the reset signal.

* * * * *